(12) United States Patent
Sato

(10) Patent No.: US 7,564,744 B2
(45) Date of Patent: Jul. 21, 2009

(54) CLOCK SYSTEM FOR REPRODUCING APPARATUS AND METHOD

(75) Inventor: Morihiko Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 511 days.

(21) Appl. No.: 10/554,184

(22) PCT Filed: Feb. 19, 2004

(86) PCT No.: PCT/JP2004/001918

§ 371 (c)(1),
(2), (4) Date: Oct. 21, 2005

(87) PCT Pub. No.: WO2004/095454

PCT Pub. Date: Nov. 4, 2004

(65) Prior Publication Data

US 2006/0233074 A1    Oct. 19, 2006

(30) Foreign Application Priority Data

Apr. 23, 2003    (JP)    ............................. 2003-118471

(51) Int. Cl.
G11B 7/007    (2006.01)
G11B 7/005    (2006.01)

(52) U.S. Cl. ............... 369/32.01; 369/47.28; 369/44.26
(58) Field of Classification Search ................. None
See application file for complete search history.

(56) References Cited

U.S. PATENT DOCUMENTS

| | | | | |
|---|---|---|---|---|
| 4,873,679 A | * | 10/1989 | Murai et al. | ............. 369/30.23 |
| 5,383,063 A | * | 1/1995 | Bannai et al. | ................. 360/18 |
| 5,420,690 A | * | 5/1995 | Koishi | ........................ 386/105 |
| 5,488,593 A | * | 1/1996 | Furumiya et al. | ........ 369/30.09 |
| 5,600,623 A | * | 2/1997 | Miyazaki et al. | ............ 720/670 |
| 5,656,348 A | * | 8/1997 | Kudo et al. | ................ 428/64.1 |
| 6,134,196 A | * | 10/2000 | Sato et al. | ................ 369/44.27 |
| 6,437,937 B1 | * | 8/2002 | Guo et al. | ................ 360/78.05 |

FOREIGN PATENT DOCUMENTS

| | | |
|---|---|---|
| JP | 4-254967 | 9/1992 |
| JP | 06-180944 | 6/1994 |
| JP | 6-180944 | 6/1994 |
| JP | 7-45007 | 2/1995 |
| JP | 7-296521 | 11/1995 |
| JP | 11-96668 | 4/1999 |

* cited by examiner

*Primary Examiner*—Michael V Battaglia
(74) *Attorney, Agent, or Firm*—Frommer Lawrence & Haug LLP; William S. Frommer; Ellen Marcie Emas

(57) ABSTRACT

Reproduction signals which are simultaneously obtained from an Ach head 3 and a Bch head 4 are time division multiplexed by a signal layout converting circuit 9 and arranged. An HPF unit 12 and an LPF unit 14 of a waveform equalizing circuit 16 are optimally switched on the basis of sync adjustment information such as switching information of the heads. An edge detection pulse width of an edge detecting circuit and an output frequency of a VCO 23 are controlled on the basis of the sync adjustment information. The output frequency of the VCO 23 is used as a clock signal of the reproduction signals by a signal processing unit 27 at the post stage.

5 Claims, 5 Drawing Sheets

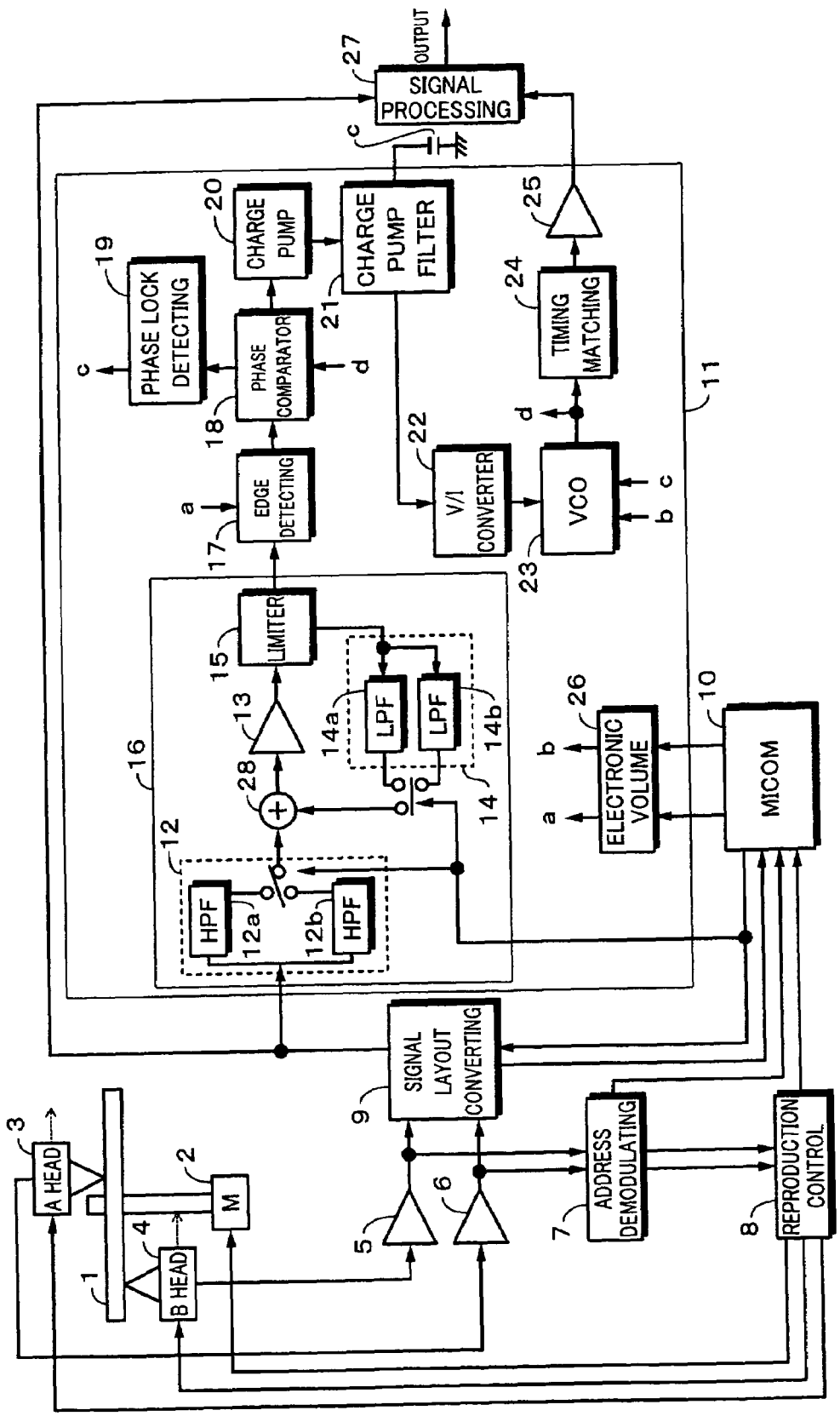

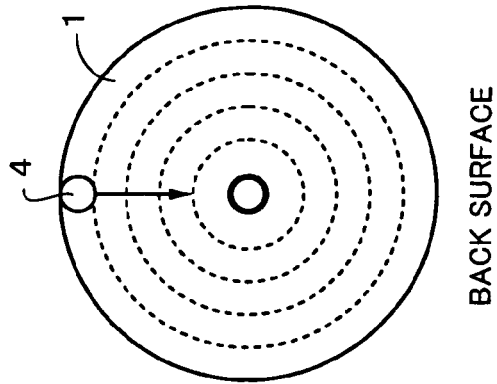
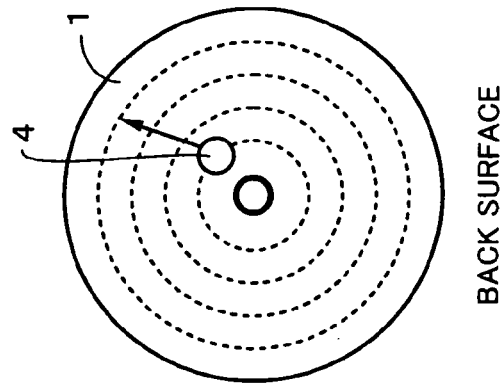
Fig. 5A
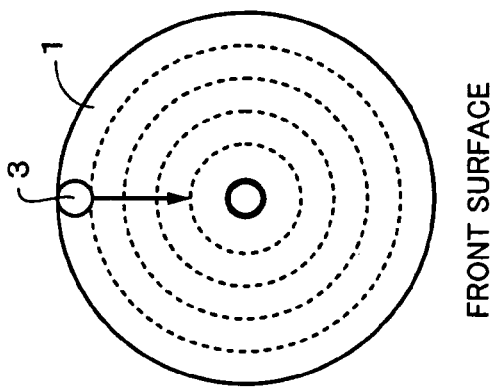
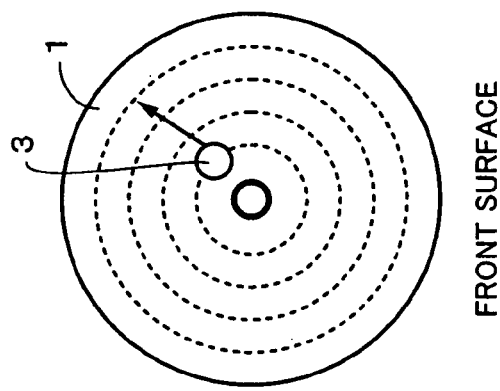
Fig. 5B

CLOCK SYSTEM FOR REPRODUCING APPARATUS AND METHOD

TECHNICAL FIELD

The invention relates to reproducing apparatus and method and, more particularly, the invention is suitable when it is applied to reproduction of a disc-shaped recording medium of an improved constant angular velocity system or the like.

BACKGROUND ART

As a recording/reproducing system of a disc-shaped recording medium, there is an improved constant angular velocity (hereinbelow, referred to as MCAV (Modified Constant Angular Velocity)) system. It is a system which satisfies both of a constant angular velocity (CAV: Constant Angular Velocity) system which attaches importance to high-speed accessing performance in that a rotational speed of a disc is controlled so as to be constant and the nearer a track approaches an outer rim where a linear velocity increases, the higher transfer rates of recording and reproduction are set and a constant linear velocity (CLV: Constant Liner Velocity) system which attaches importance to satisfying both of a predetermined transfer rate of the recording and the reproduction and a high-recording density.

A reproducing apparatus and a reproducing method of a disc-shaped recording medium having zones of different transfer rates as in the MCAV system or the like have been disclosed in the specification of Japanese Patent No. 3106750.

However, the following problems exist in the reproduction of the disc-shaped recording medium of the MCAV system. To allow a head to trace the disc-shaped recording medium and read a reproduction signal, a waveform equalizing circuit for correcting characteristics of the reproduction signal, a clock reproducing circuit to obtain bit synchronization, for example, a PLL (Phase Locked Loop) or the like are necessary. However, the disc-shaped recording medium of the MCAV system has a plurality of zones of the different transfer rates and there is a case where a difference between the transfer rate of the innermost rim and that of the outermost rim reaches three times or more. Therefore, it is very difficult to reproduce the disc-shaped recording medium of the MCAV system by the single clock reproducing circuit.

In the reproducing apparatus having a plurality of heads for reproducing the disc-shaped recording medium of the MCAV system, it is necessary to equip a clock extracting circuit corresponding to the different transfer rates which are used when the respective heads reproduce. In the conventional reproducing apparatus, therefore, there is such a problem that if signal processes of transfer rates in a wide range are enabled, parts of high performance and high costs are necessary, a circuit scale enlarges, or costs rise.

In the reproduction of the disc-shaped recording medium of the MCAV system using a plurality of heads, since different transfer rates are accessed, in order to optimize a reproduction signal obtained from each head, there is a case where an optimum one of a plurality of clock extracting circuits is selected and processes are executed. In this case, since an accessing time to access each clock extracting circuit and a switching time to switch the processes are necessary, there is such a problem that a processing time which is required until the reproducing operation reaches a stable region is long.

In the reproduction of the disc-shaped recording medium of the MCAV system using a plurality of heads, to enable the reproduction of the transfer rates in a wide range, there has been proposed a method whereby each transfer rate zone is divided into two zones of a high-transfer rate zone and a low-transfer rate zone and, upon extraction of the reproduction signal by each reproducing head, the signal processes are executed so that the sum of the transfer rates is always constant. In this case, there is such a problem that a control system for making management to set the sum of the transfer rates to be constant to each zone becomes complicated.

Those problems obstruct reduction of a signal processing time and an accessing time in a disc-shaped recording medium of the next-generation high-density recording which is predicted in future.

To solve the above problems, therefore, it is an object of the invention to provide reproducing apparatus and method which can realize rationalization of a scale of a clock extracting circuit of reproduction signals which are simultaneously obtained from a plurality of heads and realize low costs and a high processing speed.

DISCLOSURE OF INVENTION

To accomplish the above object, according to the invention, there is provided a reproducing apparatus in which a first reproduction signal and a second reproduction signal are simultaneously obtained by a plurality of reading means from a disc-shaped recording medium on which data of a high-transfer rate and data of a low-transfer rate have been recorded, comprising: signal layout converting means for time division multiplexing the first reproduction signal and the second reproduction signal and arranging them; sync adjustment information forming means for forming sync adjustment information which is optimum to each reproduction signal from the first reproduction signal and the second reproduction signal; waveform equalizing means for executing a waveform equalizing process to an output of the signal layout converting means; switching means for switching characteristics of the waveform equalizing means in accordance with the sync adjustment information; and a PLL for generating a clock signal according to the sync adjustment information.

According to the invention, there is provided a reproducing method whereby a first reproduction signal and a second reproduction signal are simultaneously obtained by a plurality of reading means from a disc-shaped recording medium on which data of a high-transfer rate and data of a low transfer rate have been recorded, comprising: a signal layout converting step of multiplexing the first reproduction signal and the second reproduction signal and arranging them; a sync adjustment information forming step of forming sync adjustment information which is optimum to each reproduction signal from the first reproduction signal and the second reproduction signal; a waveform equalizing step of executing a waveform equalizing process to an output of the signal layout converting means; and a step of switching characteristics of the waveform equalizing step in accordance with the sync adjustment information, inputting an output signal of the waveform equalizing step to a PLL, and generating a clock signal according to the sync adjustment information.

According to the reproducing apparatus and method of the invention constructed as mentioned above, the first reproduction signal and the second reproduction signal are time division multiplexed and arranged, the sync adjustment information which is optimum to each reproduction signal is formed from the first reproduction signal and the second reproduction signal, the waveform equalizing process is executed to the output of the signal layout converting means, the characteristics of the waveform equalization are switched in accordance with the sync adjustment information, and the clock signal according to the sync adjustment information is generated by the PLL, so that the invention can rapidly cope with the transfer rates of a wide range and can be constructed by the clock reproducing circuit of a single system.

BRIEF DESCRIPTION OF DRAWINGS

FIG. 1 is a schematic diagram showing an example of a construction of a reproducing apparatus according to an embodiment of the invention.

FIGS. 5A and 5B are schematic diagrams showing another example of the operation of the head.

BEST MODE FOR CARRYING OUT THE INVENTION

Figure 2A:
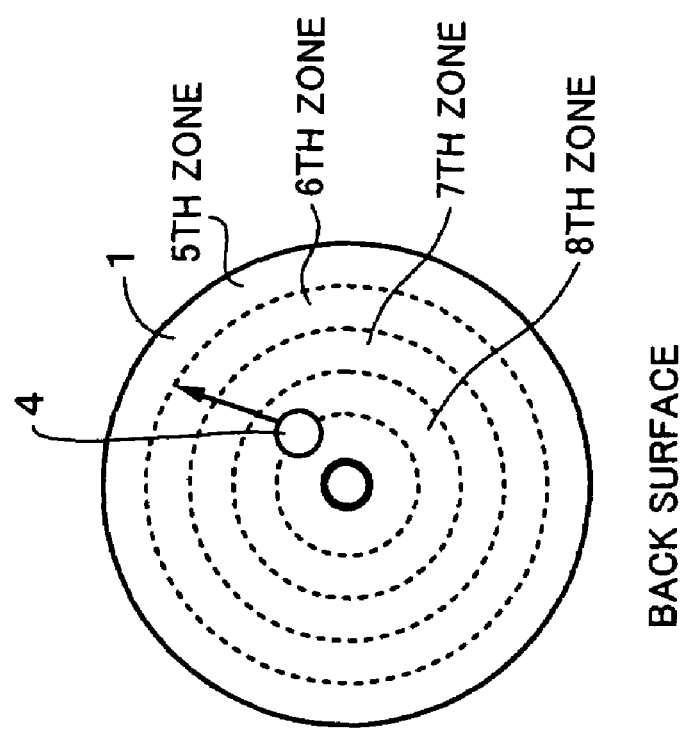
FIGS. 2A and 2B are schematic diagrams showing an example of the operation of a head.

A reproducing apparatus according to an embodiment of the invention will be described hereinbelow. FIG. 1 shows an example of a construction of a driving system of the reproducing apparatus of a disc-shaped recording medium and a clock extracting circuit.

Reference numeral 1 denotes a disc-shaped recording medium (hereinafter, referred to as a disc) of the MCAV system in which recorded reproduction signals are read out from both of a front surface and a back surface of the disc. The disc 1 is rotated by a spindle motor 2. A video signal, an audio signal, and the like encoded by an MPEG (Moving Picture Experts Group) 2 system or the like have been recorded on the disc 1. The disc 1 has data of a high-transfer rate and data of a low-transfer rate. Those transfer rates will be described in detail hereinafter.

An Ach head 3 reproduces the front surface of the disc 1 and, at the same time, a Bch head 4 reproduces the back surface of the disc 1. The Ach head 3 and the Bch head 4 read the data of the high-transfer rate and the data of the low-transfer rate. A first reproduction signal read by the Ach head 3 is supplied to a preamplifier 6. A second reproduction signal read by the Bch head 4 is supplied to a preamplifier 5.

The preamplifier 5 amplifies the second reproduction signal read by the Bch head 4. The preamplifier 6 amplifies the first reproduction signal read by the Ach head 3. An output signal of the preamplifier 5 and an output signal of the preamplifier 6 are supplied to a signal layout converting circuit 9 and an address demodulating unit 7.

The address demodulating unit 7 demodulates address data from the output signal of the preamplifier 5 and detects a track deviation and a linear velocity. The address demodulating unit 7 also demodulates address data from the output signal of the preamplifier 6 and detects a track deviation and a linear velocity. The respective demodulated address data and information of the respective detected track deviations and linear velocities are supplied to a reproduction control unit 8 and a microcomputer (hereinafter, referred to as a micom) 10.

The reproduction control unit 8 makes feedback control of positions of the Ach head 3 and the Bch head 4 and makes rotation control of the spindle motor 2 on the basis of the respective address data demodulated by the address demodulating unit 7 and the information of the respective detected track deviations and linear velocities. Those control information is supplied to the micom 10.

The signal layout converting circuit 9 layout-converts the output signals from the preamplifiers 5 and 6 on a time base. Details of the layout conversion will be described hereinafter. The signals which were layout-converted by the signal layout converting circuit 9 are stored into an FIFO (First In First Out) buffer. The signals stored in the FIFO buffer are supplied to a signal processing unit 27 and a clock extracting unit 11 at the post stage under control of the micom 10.

The micom 10 recognizes the transfer rate by the layout information obtained from the address data of the signal layout converting circuit 9 and switching information of the outputs of the preamplifiers, that is, the switching information showing timing for switching the reproduction outputs of the two heads. The micom 10 forms optimum sync adjustment information on the basis of the recognized transfer rate and various kinds of information which is supplied from the address demodulating unit 7, the reproduction control unit 8, and the signal layout converting circuit 9. The sync adjustment information formed in the micom 10 is supplied to an electronic volume 26.

The clock extracting unit 11 is an internal signal generating circuit corresponding to the high-transfer rate and the low-transfer rate. An example of an internal construction of the clock extracting unit 11 will be described hereinbelow. The output signal from the FIFO buffer of the signal layout converting circuit 9 is first supplied to a waveform equalizing circuit 16 in the clock extracting unit 11. The waveform equalizing circuit 16 is constructed by: a high pass filter (hereinafter, abbreviated to HPF) unit 12; an adder 28; an RF amplifier 13; a low pass filter (hereinafter, abbreviated to LPF) unit 14; and a binary limiter circuit (LIM) 15.

The HPF unit 12 has an HPF 12a for the high-transfer rate and an HPF 12b for the low-transfer rate and the HPFs 12a and 12b to be used for processes are switched under control of the micom 10. Such control is made in accordance with the sync adjustment information based on the foregoing various information supplied to the micom 10, for example, on the basis of the transfer rate information and the switching information of the outputs of the preamplifiers. An output signal of the HPF unit 12 is supplied to the adder 28. The adder 28 adds an output signal of the LPF unit 14 to the output signal of the HPF unit 12. An output signal of the adder 28 is amplified by the RF amplifier 13 and supplied to the binary limiter circuit 15.

The binary limiter circuit 15 converts an analog signal supplied from the RF amplifier 13 into a digital binary signal. An output signal of the binary limiter circuit 15 is supplied to the LPF unit 14 and a clock reproducing circuit. The LPF unit 14 has an LPF 14a for the high-transfer rate and an LPF 14b for the low-transfer rate and the LPFs 14a and 14b to be used for processes are switched under control of the micom 10. Such control is made in accordance with the sync adjustment information based on the foregoing various information supplied to the micom 10, for example, on the basis of the transfer rate information and the switching information of the outputs of the preamplifiers. The output signal of the LPF unit 14 is returned to the adder 28.

The clock reproducing circuit is constructed by: an edge detecting circuit 17; a phase comparator 18; a phase lock detecting circuit 19; a charge pump circuit 20; a charge pump filter circuit 21; a current-voltage converting circuit (hereinafter, properly referred to as a V/I converter) 22; an internal clock signal generator (hereinafter, properly referred to as VCO (Voltage Controlled Oscillator)) 23; a timing matching circuit 24; and an RF buffer 25. A PLL is constructed by the VCO 23, the phase comparator 18, the charge pump circuit 20, and the charge pump filter circuit 21.

The signal supplied from the binary limiter circuit 15 to the clock reproducing circuit is first supplied to the edge detecting circuit 17. The edge detecting circuit 17 sets the digital signal supplied from the binary limiter circuit 15 to the high level synchronously with each of a leading edge and a trailing edge and converts it into a pulse time width which is equal to about ¼ of a time width T as a pulse width of an output pulse of the VCO 23. The conversion of the pulse time width is determined by predetermined characteristics of the VCO 23 and a control signal (a) from the electronic volume 26, which will be explained hereinafter.

An edge detection pulse as an output signal of the edge detecting circuit 17 is supplied to the phase comparator 18. The phase comparator 18 compares a phase of the edge detection pulse from the edge detecting circuit 17 with that of an output signal (d) of the VCO 23 and generates a comparison output of a pulse width according to a phase difference.

The comparison output of the phase comparator 18 is supplied to the phase lock detecting circuit 19, which will be explained hereinafter. The comparison output of the phase comparator 18 is supplied to the charge pump circuit 20. The charge pump circuit 20 converts a phase difference time signal as a comparison output of the phase comparator 2 into a current value.

An output signal of the charge pump circuit 20 is supplied to the charge pump filter 21. The charge pump filter 21 determines a time constant upon transferring to the VCO 23 by, for example, a resistor and a capacitor C. That is, the charge pump filter 21 forms a control voltage which is supplied to the VCO 23 through the V/I converter 22.

An current-converted output signal of the charge pump filter 21 is transmitted to the current-voltage converting circuit 22. The V/I converter 22 converts a current signal inputted from the charge pump filter 21 into a voltage signal.

The output voltage of the V/I converter 22 is supplied as a control voltage to a control terminal of the VCO 23. The VCO 23 generates a signal of a frequency according to the output voltage of the V/I converter 22 on the basis of a control signal (b) of the electronic volume 26, which will be explained hereinafter, and an output signal (c) of the phase lock detecting circuit 19.

The signal generated from the VCO 23 is fed back to the phase comparator 18 and this signal is outputted to the timing matching circuit 24. The output frequency from the VCO 23 can be also divided by a frequency divider (not shown) and subsequently supplied to the phase comparator 18 and the timing matching circuit 24.

The timing matching circuit 24 varies a phase of the signal supplied from the VCO 23. An output signal of the timing matching circuit 24 is stored into the RF buffer 25. The RF buffer 25 supplies the stored signal to the signal processing unit 27. The signal processing unit 27 executes various signal processes to the output signal supplied from the signal layout converting circuit 9. At this time, the output signal from the RF buffer 25 is used as a clock signal.

The phase lock detecting circuit 19 makes a discrimination of the phase lock according to the comparison output inputted from the phase comparator 18. The output signal (c) as a discrimination result of the phase lock detecting circuit 19 is supplied to the VCO 23.

The electronic volume 26 forms the control signals (a) and (b) in correspondence to each transfer rate in accordance with the sync adjustment information supplied from the micom 10, for example, on the basis of the head switching information and the linear velocity information and optimizes the edge detecting circuit 17 and the VCO 23.

Details of the layout conversion in the signal layout converting circuit 9 mentioned above will now be described. First, relations of an example of the disc-shaped recording medium, zones, access of the heads, and the transfer rates will now be described with reference to FIGS. 2A and 2B.

Figure 2B:
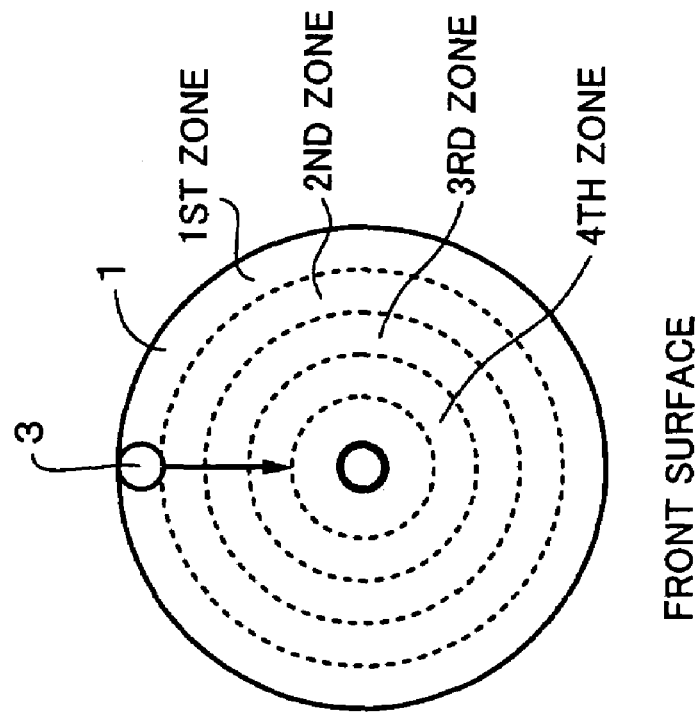

FIG. 2A shows the front surface side of the disc 1. FIG. 2B shows the back surface side of the disc 1. On the front surface of the disc 1, the Ach head 3 accesses the tracks from the outer rim toward the inner rim direction as shown by an arrow in FIG. 2A. On the back surface of the disc 1, the Bch head 4 accesses the tracks from the inner rim toward the outer rim direction.

The disc 1 has a plurality of zones. In the example shown in FIGS. 2A and 2B, the first to fourth zones are sequentially provided on the front surface of the disc 1 from the outside to the inside and the fifth to eighth zones are sequentially provided on the back surface from the outside to the inside. Although the zones shown in FIGS. 2A and 2B are illustrated by simply dividing one side into four regions for simplicity of explanation, a construction of the zones is not limited to such an example.

The disc 1 is a disc-shaped recording medium of the MCAV system and the data has been recorded so as to make an information linear density almost constant. Therefore, if the data is reproduced at a constant angular velocity, the nearer the track approaches the outer rim, the higher the transfer rate of the signal is, and the nearer the track approaches the inner rim, the lower the transfer rate is.

In the reproducing apparatus according to the embodiment, the transfer rate is divided into two rates of the high-transfer rate and the low-transfer rate at a predetermined position on the disc 1. For example, in the example shown in FIGS. 2A and 2B, the first, second, fifth, and sixth zones on the outer rim side are set to the high-transfer rate and the third, fourth, seventh, and eighth zones on the inner rim side are set to the low-transfer rate. That is, the data recorded in the 1st, 2nd, 5th, and 6th zones is the data of the high-transfer rate and the data recorded in the 3rd, 4th, 7th, and 8th zones is the data of the low-transfer rate.

As shown in FIGS. 2A and 2B, the reproducing apparatus according to the embodiment can control in such a manner that the two heads of the front and back surfaces are accessed in the radial direction of the disc in the opposite directions, respectively, and the sum of the transfer rates is set to be almost constant. In FIGS. 2A and 2B, the Ach head 3 of the front surface traces from the outer rim to the inner rim side of the disc and the Bch head 4 of the back surface traces from the inner rim to the outer rim side of the disc. However, they can also trace in the directions opposite to them.

In the reproducing apparatus according to the embodiment mentioned above, when the reproduction control unit 8 designates a desired address on the basis of such a reproduction tracing pattern, each of the Ach head 3 and the Bch head 4 accesses the track to trace so that the sum of the transfer rates is always set to be constant from the address data detected by the address demodulating unit 7.

Figure 3A:
FIGS. 3A to 3D are schematic diagrams showing an example of layout conversion of signals according to the embodiment of the invention.
Figure 3B:
Figure 3C:
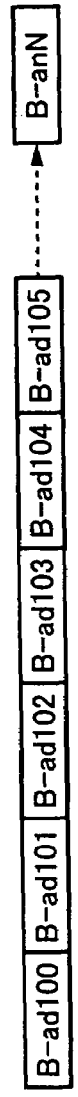
Figure 3D:
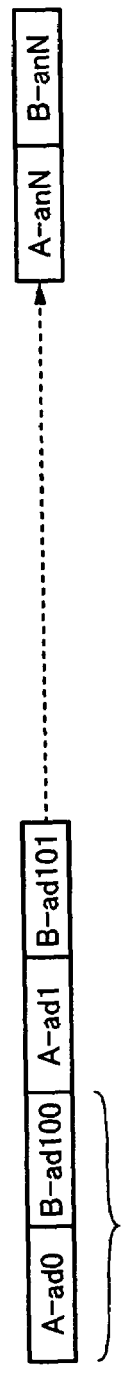

The first and second reproduction signals accessed by those heads are arranged as a pair by the signal layout converting circuit 9. FIGS. 3A to 3D show an example of two signal layouts. FIG. 3A shows a head switching timing. FIG. 3B shows the signals read by the Ach head. FIG. 3C shows the signals read by the Bch head. FIG. 3D shows the signals after the layout conversion.

Signals A-ad0, A-ad1, . . . read by the Ach head 3 shown in FIG. 3B and signals B-ad100, B-ad101, . . . read by the Bch head 4 shown in FIG. 3C are time division multiplexed as shown in FIG. 3D. Data units such as A-ad0, B-ad100, and the like which are time division multiplexed are, for example, packets of a program stream of MPEG2.

Each of the arranged signals is inputted to the clock extracting unit 11. The micom 10 switches the HPF unit 12 and the LPF unit 14 of the waveform equalizing circuit in the clock extracting unit 11 on the basis of the sync adjustment information such as transfer rate information, switching information, and the like, thereby converting the signal into the optimum binary signal.

Figures 4A, 4B, 4C, 4D, 4E:
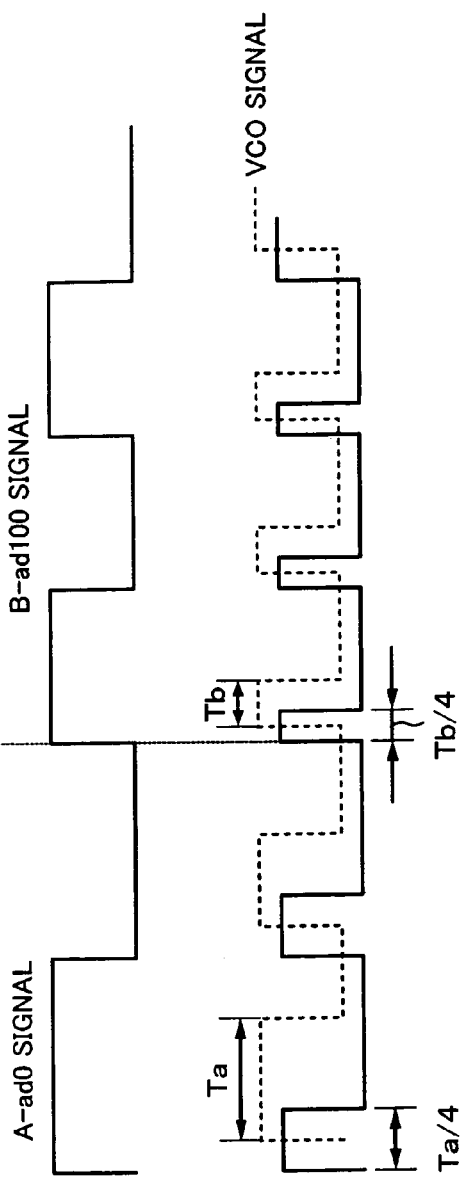
FIGS. 4A to 4E are schematic diagrams for explaining synchronization control according to the embodiment of the invention.

Details of the synchronization control in the clock reproducing circuit mentioned above will now be described with reference to FIGS. 4A to 4E. FIG. 4A shows the reproduction signal which was read by the Ach head 3 and the Bch head 4 and multiplexed as mentioned above. FIG. 4B shows a switching signal. The electronic volume 26 sets the control signal (a) in accordance with the foregoing sync adjustment information, for example, on the basis of two information of the transfer rate information and the switching information. FIG. 4D shows a waveform of the multiplexed reproduction data.

On the basis of the control signal (a) supplied from the electronic volume 26, the edge detecting circuit 23 automatically sets a pulse width of the output signal from the limiter 15 to a value of about ¼ of a clock period of the VCO 23 as shown in FIG. 4E. On the basis of the control signal (b) supplied from the electronic volume 26, the VCO 23 changes a frequency of the clock signal to be outputted so that the leading edge lies within the pulse width of the ¼ period as shown by a broken line in FIG. 4E.

The phase synchronization corresponding to the transfer rates of the wide range is performed by automatically controlling the relation between the binary pulse widths and the clock signal of the VCO 26 in accordance with the change in transfer rate as mentioned above.

FIG. 4C shows the phase lock detection signal. It is necessary to instantaneously perform the phase locking with respect to the portion where the transfer rate changes suddenly due to the switching of the heads or the like. Therefore, in addition to the foregoing sync adjustment information, for example, the two information of the transfer rate information and the switching information, as shown in FIG. 4C, by instantaneously performing the shape change of the pulse width in the edge detecting circuit 23 by the control signal (a) and the frequency change of the VCO 23 by the control signal (b) when the output signal of the phase lock detecting circuit 19 is changed to the low level, the high-speed phase synchronization is performed.

The clock signal which was optimally phase-synchronized is transmitted to the signal processing unit 27 of a running system and a signal processing system for demodulation and the like at the post stage of the clock extracting unit 11 and a disc recording and reproducing apparatus is formed.

A reproducing method of the disc 1 in which the sums of the transfer rates of the front and back surfaces of the disc 1 are not constant will now be described with reference to FIGS. 5A and 5B. According to a tracing pattern of the head shown in FIG. 5A, both of the Ach head 3 and the Bch head 4 trace from the outer rim of each of the front and back surfaces of the disc toward the inner rim side, that is, from the zone of the high-transfer rate to the zone of the low-transfer rate. According to a tracing pattern of the head shown in FIG. 5B, both of the Ach head 3 and the Bch head 4 trace from the inner rim of each of the front and back surfaces of the disc toward the outer rim side, that is, from the zone of the low-transfer rate to the zone of the high-transfer rate.

When a target address is designated in the reproduction control unit 8 on the basis of the reproduction tracing patterns shown in FIGS. 5A and 5B, the track which is traced by each head is accessed from the address data detected by the address demodulating unit 7. As for a flow of the subsequent signal processes, in a manner similar to the above description, the clock is extracted, the sync clock signal which is thus outputted is transmitted to the signal processing unit 27 at the post stage, and the disc recording and reproducing apparatus is formed.

As described above, according to the embodiment, the reproduction signals are simultaneously read out of the disc-shaped recording medium of the MCAV system by the two heads of the Ach head 3 and the Bch head 4. The read-out two reproduction signals are time-sequentially multiplexed by the signal layout converting circuit 9 and layout-converted. The micom 10 controls the outputs of the electronic volume 26 so as to optimize the switching of the HPF unit 12 and the LPF unit 14 and the outputs of the edge detecting circuit 17 and the VCO 23. Therefore, the clock extracting unit 11 can be constructed by one system. Consequently, the circuit system is simplified, the circuit scale is reduced, and the disc recording and reproducing apparatus which is very effective also in terms of the costs can be realized.

Also in the signal processes of the reproduction signals of the transfer rates which are largely different, the good clock signal can be easily extracted by optimally controlling on the basis of the switching information of the heads, the transfer rate information obtained from the linear velocities, and the adjustment parameters in the clock extracting unit 11 based on those information.

By controlling the clock extracting unit 11 by the output information of the phase lock detecting circuit 19 in addition to the sync adjustment information such as transfer rate information, switching information, and the like, even if the access is freely executed irrespective of the tracing zone of each head, that is, irrespective of the sum of the transfer rates, the phase synchronization can be performed. The disc recording and reproducing apparatus which is very advantageous in the realization of a high speed of the trackability of the tracking control regarding the servo system and the accessing speed at the time of the random access can be realized.

Since the automatic control and the optimizing process of the pulse width of the edge detecting circuit 17 and the output frequency of the VCO 23 are executed in the clock reproducing circuit, the phase synchronization can be held in accordance with the instantaneous change of the transfer rate. Easiness and stability of the tracking control regarding the servo system and the high-speed accessing performance at the time of the random access are remarkably improved.

The invention is not limited to the embodiment of the invention as mentioned above but many modifications and applications are possible within the scope without departing from the spirit of the invention. For example, although the above embodiment has a construction in which the disc-shaped recording medium in the MCAV format is used as a disc 1 and the heads are provided for the front and back sides of the disc 1, the invention is not limited to such a construction but a construction in which the head is provided only for one side can be also used so long as it is a construction in which the reproduction signals are read out from a plurality of heads. The disc 1 is not limited to the disc in the MCAV format but the invention can be further applied to various disc-shaped recording media such as optical disc, magnetooptic disk, magnetic disk, and the like.

Although the transfer rate has been divided into two rates of the low-transfer rate and the high-transfer rate, the transfer rate can be also further finely divided so as to cope with three or more different transfer rates.

Although the data of the respective heads is alternately multiplexed on a packet unit basis in the layout conversion in the signal layout converting circuit 9 described in FIGS. 3A to 3D, another multiplexing construction and another data unit can be also used so long as the reproduction signals from the respective heads are multiplexed into one signal.

As described above, according to the reproducing apparatus and method of the invention, from the first and second reproduction signals simultaneously read out of the disc-shaped recording medium by a plurality of reading means, the sync adjustment information which is optimum to each reproduction signal is formed, those reproduction signals are time division multiplexed, the time division multiplexed reproduction signal is processed by switching the waveform equalizing characteristics in accordance with each sync adjustment information, and the clock signal according to the sync adjustment information is generated. Therefore, the clock extracting circuit can be constructed by a single system. The clock signal corresponding to the reproduction signals of the transfer rates of the wide range can be formed without making the circuit redundant. Consequently, the generation of the clock signal corresponding to the reproduction signals of the transfer rates in the wide range can be realized at a high speed with low costs.

The invention claimed is:

1. A reproducing apparatus in which a first reproduction signal and a second reproduction signal are simultaneously obtained by a plurality of reading means from a disc-shaped recording medium on which data of a high-transfer rate and data of a low-transfer rate have been recorded, comprising:
   signal layout converting means for time division multiplexing said first reproduction signal and said second reproduction signal and arranging them;
   sync adjustment information forming means for forming sync adjustment information, which is optimum to each reproduction signal from said first reproduction signal and said second reproduction signal, based upon the transfer rate of each reproduction signal;
   waveform equalizing means for executing a waveform equalizing process to an output of said signal layout converting means;
   switching means for switching characteristics of said waveform equalizing means in accordance with said sync adjustment information; and
   a PLL for generating a clock signal according to said sync adjustment information,
   wherein said PLL comprises a voltage controlled oscillator, a phase comparator for phase-comparing an output of said voltage controlled oscillator or its frequency-divided output with an edge detection pulse of the reproduction signal, and a charge pump filter to which an output of said phase comparator is supplied and which forms a control voltage for said voltage controlled oscillator, and an output frequency of said voltage controlled oscillator and a pulse width of said edge detection pulse are controlled on the basis of switching information of heads and linear velocity information as said sync adjustment information.

2. A reproducing apparatus according to claim 1, wherein the signals are reproduced so that the sum of the transfer rate of said first reproduction signal and the transfer rate of said second reproduction signal is set to be almost constant.

3. A reproducing apparatus according to claim 1, further comprising phase lock detecting means for detecting whether or not the apparatus is in a phase locked state on the basis of the output of said phase comparator, and wherein said voltage controlled oscillator is controlled on the basis of a detection result of said phase lock detecting means.

4. A reproducing apparatus according to claim 1, wherein said disc-shaped recording medium has a duplex recording structure and said reading means are provided for both sides of the disc.

5. A reproducing method whereby a first reproduction signal and a second reproduction signal are simultaneously obtained by a plurality of reading means from a disc-shaped recording medium on which data of a high-transfer rate and data of a low-transfer rate have been recorded, comprising:
   a signal layout converting step of multiplexing said first reproduction signal and said second reproduction signal and arranging them;
   a sync adjustment information forming step of forming sync adjustment information, which is optimum to each reproduction signal from said first reproduction signal and said second reproduction signal, based upon the transfer rate of each reproduction signal;
   a waveform equalizing step of executing a waveform equalizing process to an output of said signal layout converting step;
   a step of switching characteristics of said waveform equalizing step in accordance with said sync adjustment information, inputting an output signal of said waveform equalizing step to a PLL, and generating a clock signal according to said sync adjustment information,
   wherein said PLL comprises a voltage controlled oscillator, a phase comparator for phase-comparing an output of said voltage controlled oscillator or its frequency-divided output with an edge detection pulse of the reproduction signal, and a charge pump filter to which an output of said phase comparator is supplied and which forms a control voltage for said voltage controlled oscillator, and an output frequency of said voltage controlled oscillator and a pulse width of said edge detection pulse are controlled on the basis of switching information of heads and linear velocity information as said sync adjustment information.

* * * * *